May 13, 1930.                    W. RIEHM                    1,758,374
                              COMBUSTION ENGINE
                            Filed March 15, 1926
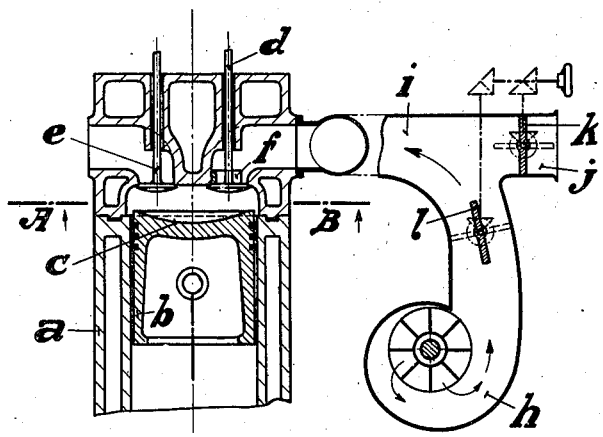
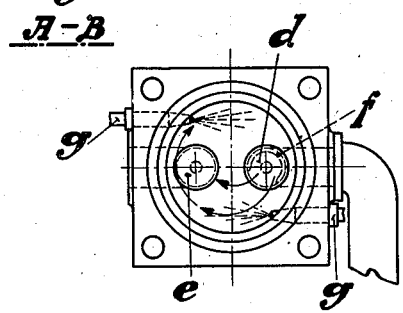
Inventor
Wilhelm Riehm
By Maréchal & Fehr
Attorneys Patented May 13, 1930

1,758,374

UNITED STATES PATENT OFFICE

WILHELM RIEHM, OF AUGSBURG, GERMANY, ASSIGNOR TO THE FIRM: MASCHINEN-FABRIK AUGSBURG-NUERNBERG, AKTIENGESELLSCHAFT, OF AUGSBURG, GERMANY, A GERMAN CORPORATION

COMBUSTION ENGINE

Application filed March 15, 1926, Serial No. 94,874, and in Germany April 11, 1925.

With combustion engines working by the injection of fuel, especially such engines which operate by solid injection of the fuel, that is without air, it is known to give a whirling or circulating motion to the combustion air in the cylinder, in order to obtain a good mixing with the injected fuel and to facilitate the proper combustion thereof. This whirling or circulating motion of the air is thereby brought about as a rule by properly constructing the air intake valve. The intensity of this whirling or circulating motion of the air will thereby depend upon the velocity of entrance of the air, which among other things, is determined by the free cross-section of the intake. In consideration of the supply of the required quantity of air within a time given therefor, it will be necessary to employ an intake cross-section which is as large as possible, and by this there is generally also given a limit for the velocity, at which the air enters the cylinder and circulates within the same.

This invention has for its object to solve the problem of still considerably increasing the velocity of the circulating motion of the combustion air beyond the limit, which is given under normal conditions therefor, and to compensate in an other way the increase of the output of the engine following therefrom. According to this invention this is accomplished by exerting upon the suction air a choking action which is considerably in excess of the choking action which takes place under normal conditions. Furthermore, the lack of air in the working cylinder which is caused by this excessive choking action is compensated according to this invention by supplying the charging air at a higher pressure. Ordinarily for high speed engines operating with solid fuel injection and with whirling air it has been the practice to provide a valve opening such that, at the most, an air speed of about 60 to 70 meters per second will be attained. At medium speeds of operation the air speed has been less than this as the suction effort of the piston is of course not as high as for high speed operation. In accordance with this invention however the air speed is considerably in excess of the normal 60 to 70 meters per second. The excessive choking of the suction air may, for instance, be attained by having the screens which are provided at the valve disc for the purpose of bringing about the whirling or circulating motion of the air, arranged in such a way that the said screens will extend over a greater part of the circumference of the valve disc than is usual according to ordinary practice. In addition to this, the required higher pressure of the charging air may be generated by a blower which is connected with the suction pipe. By properly dimensioning this blower, the same may simultaneously serve for increasing the output of the engine by increasing the quantity of the charging air, and for augmenting the intensity of the circulating or whirling motion of the combustion air.

In the drawing a combustion engine is shown as an example for carrying the invention into practice.

Fig. 1 is a vertical section through a cylinder of a combustion engine arranged according to this invention, and Fig. 2 a section according to line A—B of Fig. 1.

The working cylinder of the engine is designated with the letter $a$, the piston with $b$ and the combustion space with $c$. The suction valve is shown at $d$, and the discharge valve at $e$. The disc of the suction valve $d$ is provided with a screen or deflector $f$, which imparts in the known manner a circulating motion to the combustion air in the combustion cylinder. This screen or deflector according to the present invention extends over a far greater part of the circumference of the valve disc, than is the case in the ordinary constructions. As shown on the drawing, the screen or deflector $f$, which is of annular shape and fastened to the periphery of the valve disc, preferably extends about substantially two-thirds or more of the periphery of the valve disc. According to this invention, therefore, the remaining free cross-section of the intake for the suction air will thus be considerably decreased. By reason of the choking action, which is due to this reduced cross-section, the velocity at which the air enters into the combustion space, and also the velocity at which said air circulates within the combustion space, will be correspondingly increased and a more effective mixing with the fuel entering through the nozzles $g$ will be the result. The injecting nozzles $g$ may be arranged laterally in the combustion space, as shown in the drawing, or they may be also arranged centrally with respect to said combustion space. The heavy choking which is in this manner exerted upon the suction air by amply dimensioning the above mentioned screens on the valve disc will cause a drop of in the final pressure in the cylinder, and within the available time a smaller quantity of air will enter the cylinder thus tending to reduce the volumetric efficiency. In order to compensate for this smaller quantity of air a blower $h$ is connected to the suction conduit, which is driven by the engine and serves for the supply of a proper quantity of charging air.

In order to be able to supply charging air to the cylinder during the starting of the engine, an additional suction member $j$ is provided at the blower conduit $i$. Stop valves $k$ and $l$ are furthermore connected with this suction member and the blower conduit respectively, said stop valves being preferably positively connected with each other in such a manner, that one of said stop valves will be in its open position while the other is closed and vice versa. During normal operation of the engine, the stop valves are arranged in the opposite manner, so that the blower conduit will be open and the suction member $j$ closed. By this arrangement one will be enabled in especial cases, for instance during small loads, to operate the engine by having the blower entirely in inoperative condition.

The mode of operations herein described is especially well suited for high-speed engines, such as are used for the purpose of driving vehicles, but may also be used for stationary engines operating at smaller speeds of rotation.

I claim:

1. In a four-stroke-cycle internal combustion engine of the character described, a cylinder, a piston operating therein, a combustion air inlet conduit for feeding combustion air to said cylinder, means adjacent the opening of said combustion air inlet conduit into said cylinder for imparting a whirling motion to the air introduced within said cylinder and for abnormally restricting the cross-section for the entrance of air into said cylinder to produce a high velocity of said whirling air, considerably exceeding the normal rate of 60 or 70 meters per second fuel injection nozzles discharging substantially tangentially into the cylinder to augment the whirl of the combustion air, and means for supplying air under pressure to said conduit to compensate for said restriction and secure a normal full charge of rapidly whirling air within the cylinder.

2. In a four-stroke-cycle internal combustion engine of the character described, a cylinder, a piston therein, said parts enclosing a combustion space, an air inlet valve opening into said combustion space, a deflector associated with said valve for imparting a rotary motion to the air entering said combustion space past said valve, said deflector being of sufficient extent to materially and abnormally restrict the opening for the entrance of air into said cylinder to thereby impart a high velocity to said whirling air within said cylinder considerably exceeding the normal rate of 60 or 70 meters per second, and means for supplying air under pressure to said valve to compensate for said restriction and secure a normal full charge of rapidly whirling air within said cylinder.

3. In an internal combustion engine of the character described, a cylinder, a piston therein, a combustion air inlet conduit for said cylinder, means adjacent the opening of said conduit into said cylinder for imparting a whirling motion to the air introduced into said cylinder and for restricting the cross-section of said opening to cause a high velocity of said whirling air within said cylinder considerably exceeding the normal rate of 60 or 70 meters per second, a plurality of fuel injection nozzles discharging substantially tangentially into the cylinder to augment the whirl of the combustion air, a blower associated with said combustion air inlet conduit for supplying pressure air thereto to compensate for the said restriction and secure a normal full charge of rapidly whirling air within the cylinder, a suction air inlet conduit opening to atmosphere connected to said blower conduit, a valve positioned within each conduit, and means for simultaneously operating said valve to open one of said conduits as the other conduit is closed.

In testimony whereof I have affixed my signature.

WILHELM RIEHM.